UNITED STATES PATENT OFFICE 2,386,736

CYANOETHYLATION OF KETONES

Herman A. Bruson, Philadelphia, Pa., assignor to The Resinous Products & Chemical Company, Philadelphia, Pa., a corporation of Delaware No Drawing. Application April 19, 1941, Serial No. 389,332

2 Claims. (Cl. 260—464)

This invention relates to a method for the cyanoethylation of ketones having in juxtaposition to the ketonic carbonyl group a carbon atom bearing at least one reactive hydrogen atom and to the products thus obtained.

According to this invention acrylonitrile is reacted in the presence of an alkaline condensing agent with a ketone having an active methyl, methylene, or methenyl group immediately adjacent to its carbonyl group. By the reaction a $\beta$-cyanoethyl radical is attached to the carbon atom adjacent to the carbonyl group. If more than one hydrogen is present on this carbon atom, then more than one cyanoethyl group may be introduced.

Among the alkaline condensing agents which have been found effective for promoting the reaction are the oxides, hydroxides, hydrides, amides and alcoholates of the alkali metals or the alkali metals themselves. Similarly the alkaline earth metals and their alkaline compounds may be used. There may also be used one of the strongly basic non-metallic hydroxides such as the quaternary ammonium hydroxides. Of these a particularly effective product is the aqueous solution containing 40% of trimethyl benzyl ammonium hydroxide which is available commercially under the trade-name of "Triton B." One or several of these materials are suspended or, preferably, dissolved in the ketone itself or in a solution of the ketone in an inert liquid, such as dioxane, ether, or benzene, or in a liquid which is less reactive than the reacting ketone, such as water, or tertiary butyl alcohol.

The reaction is applicable to a wide variety of ketones of the aliphatic, arylaliphatic, aromatic, cycloaliphatic, and heterocyclic series, including saturated or unsaturated mono-ketones or polyketones. The ketones may contain other functional groups than the carbonyl group, so long as they do not readily destroy the alkaline condensing agent used. For example, these groups may be chloro, bromo, acyl, alkoxy, aryloxy, thioether, ter-amino, sulfonyl, carbalkoxy, carbamyl, thiocyano, or cyano groups. The ketone may contain more than one active methyl, methylene, or methenyl group.

Among the typical ketones having reactive groups suitable for the purpose of this invention may be mentioned the following: Acetone, phenoxyacetone, cyano-acetone, ethoxy-acetone, acetophenone, p - methyl - acetophenone, N-methyltriacetonamine, acetyl-p-cymene, acetyl tetrahydronaphthalene, p-acetyl diphenyl, acetyl anthracene, acetyl phenanthrene, p-methoxy-acetophenone, p-chloro-acetophenone, p-bromo-acetophenone, methyl-$\beta$-naphthyl ketone, acetyl cyclohexane, cyclopentanone, cyclohexanone, o-, m-, or p-methyl cyclohexanone, o-methallyl cyclohexanone, o-, m-, or p-phenyl cyclohexanone, o- or p-cyclohexyl-cyclohexanone, o- or p-benzyl cyclohexanone, menthone, p-ter-butyl cyclohexanone, p-ter-amyl cyclohexanone, o-cyclohexylidene cyclohexanone, acetonyl acetone, diacetone alcohol, mesityl oxide, phorone, methyl ethyl ketone, methyl propyl ketone, methyl isobutyl ketone, di-isopropyl ketone, di-isobutyl ketone, methyl-n-amyl ketone, di-n-propyl ketone, methyl-n-hexyl ketone, 5-ethyl - nonanone-2, methyl heptadecyl ketone, propiophenone, butyrophenone, stearophenone, 1,8-dibenzoyl octane, 1,4-dibenzoyl butane, dibenzyl ketone, desoxybenzoin, benzal acetone, dibenzyl acetone, $\alpha$-tetralone, furfural acetone, furfural-acetophenone, acetopropanol, cholestanone, androsterone, acetoacetic ester, benzoyl acetic ester, acetoacetic amide, acetoacetic nitrile, acetoacetanilide, 2-acetothienone, and other aliphatic, aromatic, arylaliphatic, cycialiphatic, and heterocyclic ketones having one or more reactive hydrogen atoms attached to a carbon atom contiguous to a C—O group.

Depending upon the number of available hydrogen atoms in the reactive methyl, methylene, or methenyl groups contiguous to carbonyl in the ketones used, and upon the quantity of acrylonitrile employed, one or more $\beta$-cyanoethyl groups may be introduced. The condensation takes place readily at temperatures from about 0° to about 80° C., although initial temperatures of 25° C. to 60° C. are preferred. The reaction is usually exothermal so that cooling, at least during the initial part of the condensation, is generally advantageous in order to control the vigor of the reaction and to prevent undesired polymerization or side reactions. In this connection it is sometimes desirable to add inhibitors such as hydroquinone, catechol, finely divided copper, copper compounds, or sulfur, etc.

The quantity of alkaline condensing agent required is relatively small, amounts of the order of 1% to 10% on the combined weight of the reactants usually being sufficient. Since the condensation ceases if the alkali is depleted by side reactions or impurities of an acid nature in the starting materials, it is advantageous to test the reaction mixture for alkalinity towards red litmus from time to time during the condensation and, if an alkaline reaction is no longer shown, to add more alkali to make up for the loss.

In general, methyl ketones having the formula R—CO—CH₃, where R is aryl (as in acetophenone and its homologues), readily take up as many as three mols of acrylonitrile as follows:

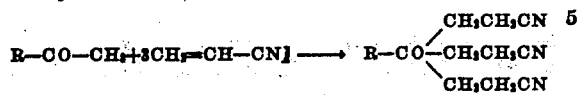

whereas cyclic ketones having the carbonyl between two —CH₂— groups, as in cyclopentanone, cyclohexanone, and their homologues, readily take up as many as four mols of acrylonitrile as follows:

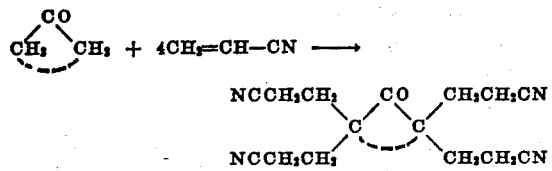

Where there is a choice between a methylene and a methyl group, as in metyl ethyl ketone and its homologues, the cyanoethyl radical appears to replace the hydrogen of the methylene group first. For example, methyl ethyl ketone, methyl-n-amyl ketone, methyl-n-hexyl ketone give crystalline di-cyanoethylation products which, however, do not show the iodoform test characteristic of —COCH₃ groups. Ketones such as acetoacetic ester, amide, or nitrile readily take up two mols of acrylonitrile to di-cyanoethylate the —CH₂— group:

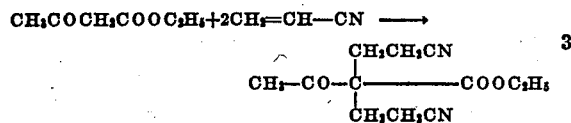

Where one or more —CH— groups are contiguous to carbonyl, each reactive hydrogen atom of the methenyl groups can be replaced by —CH₂—CH₂—CN; for example, diisopropyl ketone yields

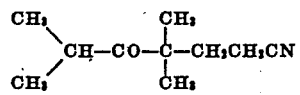

and

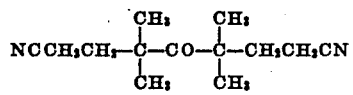

Finally, unsaturated ketones, for example, mesityl oxide, take up two mols of acrylonitrile to form a di-cyanoethylated product. The product can be further cyanoethylated on its reactive methylene groups.

The β-cyanoethylation products obtainable by the present process are new compounds. They are useful as intermediates for the preparation of monocarboxylic or polycarboxylic acids, amides, esters, amines, or polyamines, amidines, amino acids, amino alcohols, or thio-amides by the usual reactions characteristic of the nitrile group. Many of the compounds may find uses in diverse fields, including synthetic resins, artificial fibers, plastics, plasticizers, pharmaceuticals, insecticides, textile finishing and other commercial applications.

The following examples illustrate this invention, it being understood that, although trimethyl benzyl ammonium hydroxide is the preferred alkaline condensing agent, others, such as sodium ethylate, potassium, ter-amylate, sodium methylate, potassium hydroxide, sodamide, sodium metal, sodium hydride, sodium oxide, sodium hydroxide, tetramethyl ammonium hydroxide, tetraethanolammonium hydroxide, benzyl triethyl ammonium hydroxide and other quaternary ammonium hydroxides may be used.

*Example 1*

(a) To a solution of 49 g. of cyclohexanone (0.5 mol) in 200 g. of benzene there was added 5 g. of an aqueous 40% solution of trimethylbenzylammonium hydroxide. The mixture was stirred rapidly in a glass vessel fitted with a thermometer and reflux condenser, while 106 g. of acrylonitrile (2 mols) was added dropwise during a two-hour period and while the reaction mixture was maintained between 30° and 45° C. by means of external cooling. The mixture was stirred for about four hours longer until no more heat was evolved. At the end of this time a thick magma of crystalline material had formed. This was filtered off sharply by suction, washed with a little methanol and dried. There was obtained 139 g. of small, cream-colored crystals. The product can be recrystallized from acetone in the form of colorless, fine needles, melting when pure at 165° C. Its analysis corresponds to tetra-(β-cyanoethyl)-cyclohexanone having the formula

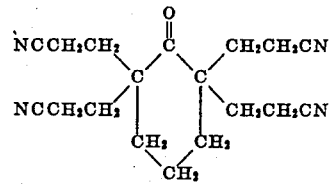

It is only slightly soluble in benzene or methanol. When boiled with aqueous 10% potassium hydroxide solution, the tetra-(β-cyanoethyl)-cyclohexanone is readily hydrolyzed to the corresponding polycarboxylic acid which separated in the form of colorless crystals upon acidifying the reaction mixture with hydrochloric acid. Upon recrystallization from hot water, it forms colorless needles melting at 179–180° C.

(b) By using only 53 g. of acrylonitrile (1 mol) in the above procedure, the yield of tetra-(β-cyanoethyl)-cyclohexanone fell to 57 g. From the filtrate there were isolated two products, one a colorless oil boiling at 150–160° C./10 mm. consisting of mono-(β-cyanoethyl)-cyclohexanone

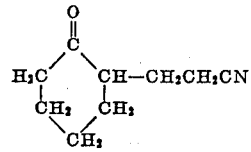

and the other a di-(cyanoethyl)-cyclohexanone boiling at 197–207° C./1 mm., which crystallized from benzene in colorless needles melting when pure at 69.5° C.

In place of trimethyl benzyl ammonium hydroxide one may use 2 g. of sodium methylate as condensation catalyst.

In the same manner, o-, m-, or p-alkyl-, aryl-, aralkyl-, cycloalkyl-, or cyano-cyclohexanones can be used in place of cyclohexanone itself.

(c) By adding 42.4 g. of acrylonitrile to a stirred solution of 2 g. of 40% potassium hydroxide solution, 50 g. of dioxane, and 19.6 g. of cyclohexanone at 40–45° C., there was obtained 42 g. of tetra-(β-cyanoethyl)-cyclohexanone, M. P. 165° C.

(d) By adding 63.5 g. of acrylonitrile to a stirred solution of 5 g. of aqueous 40% trimethyl benzyl ammonium hydroxide, 200 g. of benzene and 44.8 g. of orthomethyl cyclohexanone at 30–40° C., there was obtained, after washing and drying, 103 g. of a syrup consisting essentially of tri-(β-cyanoethyl)-o-methyl cyclohexanone. It boiled between 275–285° C./1 mm.

Example 2

To a solution of 144 g. of methyl ethyl ketone (2 mols) and 144 g. of benzene there was added 10 g. of an aqueous 40% solution of trimethylbenzyl ammonium hydroxide. The mixture was stirred and cooled to 30–35° C. while 212 g. of acrylonitrile (4 mols) was added dropwise during 2½ hours. After the addition, the mixture was stirred for three hours. There was then added 50 cc. of water and sufficient 10% hydrochloric acid to render the solution slightly acidic. The benzene layer was separated, filtered from a small amount of polymer, and the benzene removed by evaporation. The residual oil was then distilled under reduced pressure (1 mm.). After a small forerun, the main fraction came over at 184–195° C./1 mm. as a pale yellow oil weighing 177 g. On standing, it solidified to a crystalline mass which, upon recrystallization from benzene, separated in large colorless prisms melting at 67° C. Its analysis corresponds to di-(β-cyanoethyl)-butanone. The residual still residue weighed 108 g. and formed a pitch-like mass comprising higher cyanoethylation products of butanone. When boiled with aqueous 10% potassium hydroxide solution, the di-(β-cyanoethyl)-butanone is readily hydrolyzed to the corresponding dicarboxylic acid which can be extracted from the acidified dried reaction mixture with boiling ethylene dichloride, and crystallizes therefrom upon cooling, in the form of colorless crystals melting at 125° C.

Example 3

To a solution of 42 g. of cyclopentanone (0.5 mol) in 200 g. of benzene there was added 5 g. of an aqueous 40% solution of trimethylbenzyl ammonium hydroxide. The mixture was stirred and cooled to 35–45° C. while 106 g. of acrylonitrile (2 mols) was added dropwise during 1½ hours. Crystals began to separate within a few minutes after the addition was begun. As the reaction proceeded, it was necessary to add 200 cc. of benzene to prevent clogging of the stirrer by the crystalline mush. The mixture was allowed to stand for 18 hours before the crystals were filtered by suction. The product can be recrystallized from hot methyl ethyl ketone or glycol monoethyl ether ("Cellosolve") from which it separates in colorless crystals melting, when pure, at 175° C. Its analysis corresponds to tetra-(β-cyanoethyl) cyclopentanone, having the formula

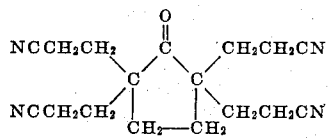

It is only very slightly soluble in benzene, toluene, or dioxane. The yield was 144 g., which corresponds to 97.3% of theory.

Example 4

212 g. of acrylonitrile was added dropwise during the course of 2½ hours to a stirred mixture of 150 g. of dioxane, 228 g. of methyl-n-amyl ketone, and 10 g. of aqueous 38% trimethylbenzyl ammonium hydroxide solution while maintaining the reaction mixture between 30° and 33° C. by external cooling. After the addition, the solution was stirred for 20 hours at room temperature. It was then acidified with dilute hydrochloric acid, taken up in ethylene dichloride and the solution washed thoroughly with water. The oil layer was evaporated to dryness under reduced pressure on a steam bath. The residual oil, weighing 400 g., was distilled in vacuuo. After a small forerun of unchanged ketone, a fraction distilled over at 195–200° C./1–2 mm. as a colorless oil which solidified to a crystalline mass. The yield was 175 g. Upon recrystallization from alcohol it formed colorless crystals melting at 63° C., the analysis of which corresponds to that for a di-(cyanoethyl) heptanone. The residual pitch consisted of higher cyanoethylation products.

Example 5

To a solution of 128 g. of octanone-2 in 200 g. of benzene there was added 5 g. of an aqueous 40% solution of trimethylbenzyl ammonium hydroxide. The mixture was stirred and cooled to 30–40° C. while 106 g. of acrylonitrile was added dropwise thereto during a two-hour period. The mixture was stirred thereafter for one hour, then washed with water, followed by dilute hydrochloric acid, and then with water. The benzene layer was separated, filtered from a small amount of resin, and the filtrate evaporated under reduced pressure. The residual oil was distilled in high vacuuo. The fraction boiling at 195–200° C./1 mm. formed a pale yellow oil which crystallized on cooling. After recrystallization from ethanol it formed colorless crystals melting when pure at 47° C. Its analysis corresponds to di-(β-cyanoethyl)-octanone. The yield was 49 g. The rest of the product boiled too high to be distilled without decomposition and consisted of a resinous mixture of higher poly-cyanoethylation products of octanone.

Example 6

To a solution of 63 g. of p-α,α, γ,γ-tetramethylbutyl cyclohexanone (0.3 mol) in 100 g. of dioxane, there was added 3 g. of an aqueous 40% solution of trimethylbenzyl ammonium hydroxide. The mixture was stirred and cooled to 30–40° C. while 63.6 g. of acrylonitrile (1.2 mols) was added dropwise thereto during 1¼ hours. The mixture was then stirred for about one hour longer at room temperature (25–30° C.) and was then warmed to 43° C. for two hours. It was cooled, acidified with dilute hydrochloric acid and washed with water. The oil was then dried on a steam bath under reduced pressure. When cold, it formed a pasty crystalline mass weighing 118 g. The product can be recrystallized from boiling methanol. It separates in colorless needles melting, when pure, at 155–156° C. Its analysis corresponds to tetra-(β-cyanoethyl)-ter-octyl-cyclohexanone having the formula

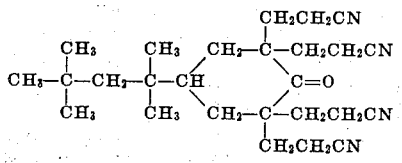

In the same manner, p-phenyl cyclohexanone, p-cyclohexyl-cyclohexanone, p-ter-butyl-cyclohexanone, p-ter-amyl-cyclohexanone, p-benzyl-cyclohexanone, or p-methyl-cyclohexanone can be used mol for mol in place of the ter-octyl-cyclohexanone to yield the corresponding tetra-β-cyanoethylation products thereof.

Example 7

To a solution of 60 g. of acetophenone in 60 g. of dioxane containing 5 g. of aqueous 40% trimethyl benzyl ammonium hydroxide solution was added 79.5 g. of acrylonitrile dropwise during two hours, while stirring and maintaining the mixture between 30° and 40° C. by external cooling. During the addition crystals began to separate. After the acrylonitrile had been added, the mixture was stirred one hour longer and filtered. There was obtained 79 g. of pinkish crystals which, upon recrystallization from glycol monoethyl ether ("Cellosolve") formed colorless needles melting at 128–129° C., the analysis of which indicated the compound to be tris-(β-cyanoethyl)-methyl phenyl ketone having the formula

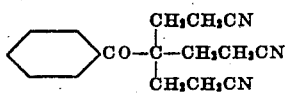

The original filtrate contains further quantities of the above compound, together with lower cyanoethylated material.

In place of acetophenone, one may use its nuclear substitution products, for example, its alkyl, aralkyl, aryl, cycloalkyl, alkoxy, aryloxy, halogen, or benzoyl derivatives, to obtain the corresponding tri-cyanoethylated products in the manner indicated above.

Example 8

To a solution of 34 g. of methyl-2-naphthyl ketone in 100 cc. of dioxane and 2 g. of aqueous 38% trimethylbenzyl ammonium hydroxide solution there was added dropwise 31.8 g. of acrylonitrile during 35 minutes, while the reaction mixture was stirred and maintained between 20° and 35° C. by means of external cooling. The mixture was then stirred four hours longer at room temperature. The dark solution was acidified with dilute hydrochloric acid, poured into two liters of water and the yellowish, viscous oil separated by taking it up in ethylene dichloride and washing the solution thoroughly with water. Upon evaporating away the ethylene dichloride under reduced pressure on a steam bath, there was obtained a reddish, viscous syrup weighing 64 grams. Upon the addition of 200 cc. of ethanol, the mixture crystallized. After recrystallization from hot ethanol, the product separated in colorless large plates melting at 122° C. The compound contains three cyanoethyl radicals and has the formula

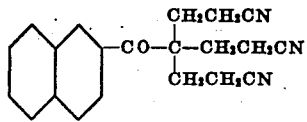

Example 9

To a solution of 37.3 g. of p-acetyl diphenyl in 150 g. of dioxane and 4 g. of aqueous 38% trimethylbenzyl ammonium hydroxide solution there was added dropwise 31.8 g. of acrylonitrile during 30 minutes while the reaction mixture was stirred and maintained at 35–40° C. by external cooling. After the mixture was stirred two hours longer at room temperature, it became crystalline. The crystals were filtered off and washed with a little dioxane. The yield was 32 g. of white crystals. After recrystallization from dioxane, tri-(β-cyanoethyl)-acetyl-diphenyl having the formula

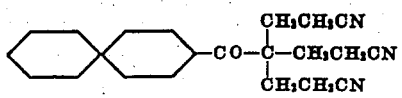

was obtained in the form of colorless plates melting at 178° C.

In place of acetyl diphenyl, one may use other acetylated polynuclear aromatic hydrocarbons such as acetyl-anthracene, acetyl-phenanthrene, acetyl-retene, and the like, to obtain the corresponding tri-cyanoethylated derivatives in the manner indicated above.

Example 10

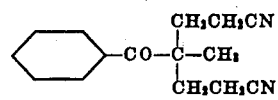

To a solution consisting of 26.8 g. of propiophenone (0.2 mol), 50 g. of dioxane and 2 g. of aqueous 38% trimethylbenzyl ammonium hydroxide solution, there was added dropwise 21.2 g. of acrylonitrile (0.4 mol) during 20 minutes while the reaction mixture was stirred and maintained between 25° and 32° C. by external cooling. The mixture was stirred for an additional five hours at 25° C., then acidified with dilute hydrochloric acid, and poured into 300 cc. of water. The oil layer was separated, taken up in ethylene dichloride, washed thoroughly with water, and the ethylene dichloride layer evaporated off on a steam bath under reduced pressure. The residual oil weighed 48 grams. It was mixed with an equal weight of ethanol and chilled, whereupon the product crystallized. After recrystallization from ethanol, the di-(β-cyanoethyl)-propiophenone formed colorless crystals melting 66° C.

In place of propiophenone, its homologues, such as butyrophenone, stearophenone, or its nuclear alkyl, aryl, aralkyl, cycloalkyl, nitro, halogen, alkoxy, or aryloxy derivatives may be used to obtain the corresponding di-cyanoethylated derivatives in the manner indicated above.

Example 11

Acrylonitrile (10.6 g.) was added dropwise during 15 minutes to a stirred solution of 70 g. of dioxane, 16.1 g. of 1,8-dibenzoyl-octane, and 2 g. of aqueous 40% trimethylbenzyl ammonium hydroxide solution while the reaction mixture was maintained at 37–45° C. by external cooling. The mixture was then stirred four hours longer at 25–30° C. and then stirred with water containing sufficient hydrochloric acid to neutralize the alkali. The oil was taken up in ethylene dichloride, the oil layer separated, washed, and concentrated under reduced pressure on a steam bath until all the solvent was removed. The residual oil, weighing 26 g., was redissolved in benzene, filtered to remove traces of polymer, and the benzene removed by evaporation in vacuo at 80–90° C. The final product was a viscous, reddish oil.

Its analysis indicated that it consisted essentially of tetra-(cyanoethyl)-dibenzoyl octane having the probable formula

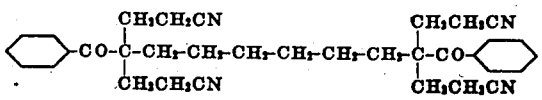

Example 12

(a) Two grams of powdered sodium methylate was added to 58 g. of methyl acetoacetate at 50–60° C. The solution was cooled to 20° C. and stirred while 26.5 g. of acrylonitrile was added dropwise during 15 minutes at 37–40° C. while cooling the mixture. The product was then stirred for two hours longer at 40° C. and allowed to stand 18 hours at room temperature. It was then poured into dilute acetic acid, the oil layer separated, dissolved in toluene, filtered from a small amount of polymer, and the toluene filtrate washed, dried, and then distilled under reduced pressure. The fraction boiling at 141–145° C./7 mm. was a colorless oil having the formula

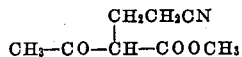

(b) To a solution of 58 g. of methyl acetoacetate, 100 g. of dioxane and 7 g. of aqueous 40% trimethylbenzyl ammonium hydroxide solution there was added dropwise 53 g. of acrylonitrile while the solution was stirred and cooled to 30–40° C. The mixture was stirred for one-half hour longer at room temperature and the crystalline product which resulted was filtered off. The yield was 54 g. A further quantity was isolated by adding water to the filtrate.

The substance formed colorless crystals melting at 154° C. after recrystallization from acetone. Its analysis corresponds to di-(β-cyanoethyl)-acetoacetic methyl ester

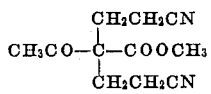

(c) By using 65 g. of ethyl acetoacetate in place of the methyl acetoacetate in the above example, the corresponding di-(β-cyanoethyl)-acetoacetic ethyl ester separated as a crystalline mass when the reaction mixture was poured into one liter of ice water. After recrystallization from ethanol, the compound formed colorless crystals melting at 82° C.

In the same manner, other esters of acetoacetic acid may be used, for example, the isopropyl, the butyl, the benzyl, phenyl or cyclohexyl esters.

Example 13

(a) To a solution of 53.1 g. of acetoacetanilide in 100 g. of dioxane containing 2 g. of aqueous 40% trimethylbenzyl ammonium hydroxide solution there was added dropwise 31.8 g. of acrylonitrile while stirring and cooling to 30–33° C. When the exothermal reaction was finished, the mixture was warmed for 2½ hours at 45–50° C., then cooled, washed with water containing sufficient hydrochloric acid to neutralize the alkali, and finally thoroughly washed with water. The product separated as a heavy oil, which, after being dried on a steam bath under reduced pressure, formed a pale amber-colored, resinous mass. It was dissolved in hot ethanol from which it slowly crystallized on standing. The colorless, pure crystals obtained after repeated recrystallization from ethanol melted at 82° C. Analysis indicated the presence of two cyanoethyl groups corresponding to the formula

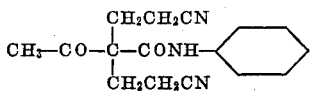

despite the fact that acetoacetanilide itself melts at 85° C. A mixed melting point of the two compounds, however, shows a big depression.

In the same manner, the ethylamide, butylamide, laurylamide or cetylamide of acetoacetic acid may be used in place of the anilide.

(b) To a solution of 63.5 g. of ortho-chloro-acetoacetoanilide, 100 g. of dioxane and 2 g. of aqueous 40% trimethylbenzyl ammonium hydroxide solution there was added dropwise, while the solution was stirred at 30–36° C., 31.8 g. of acrylonitrile. The mixture was then heated at 40–50° C. for three hours. The clear solution obtained was acidified with dilute hydrochloric acid, poured into ethylene dichloride and washed with water. The ethylene dichloride was then evaporated off, under reduced pressure, on a steam bath. There was obtained 92 g. of a pale amber, resinous syrup which became crystalline when it was dissolved in ethanol and chilled. Upon recrystallization from ethanol 66 g. of colorless crystals melting at 105° C. were obtained. Analysis indicated the presence of two cyanoethyl groups corresponding to the formula

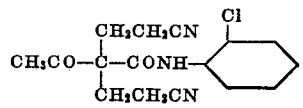

Despite the fact that ortho-chloro-acetoacetanilide itself melts at very nearly the same temperature, a mixed melting point of the two compounds shows a big depression.

(c) A mixture consisting of 100 g. of dioxane, 3 g. of aqueous 38% trimethyl benzyl ammonium hydroxide solution and 73.8 g. of 2,5-dichloro-acetoacetanilide was stirred and warmed to 40° C. while 31.8 g. of acrylonitrile was gradually added. The mixture was heated 2½ hours at 40–45° C., then cooled, neutralized with dilute hydrochloric acid, taken up in ethylene dichloride, and washed with water. The ethylene dichloride layer was separated and evaporated to dryness in vacuo on a steam bath. The residue, weighing 89 g., was a viscous, sticky balsam which did not readily crystallize. On standing in chilled ethanol solution for some time, it gradually solidified to a crystalline mass which, after several recrystallizations from ethanol, formed colorless crystals melting at 121° C., containing by analysis two cyanoethyl radicals and having the formula

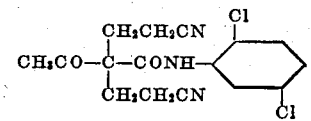

Example 14

To a solution of 29.4 g. of mesityl oxide (0.3 mol), 5 g. of aqueous 38% trimethylbenzyl ammonium hydroxide solution and 50 g. of dioxane there was added dropwise 31.8 g. of acrylonitrile (0.6 mol) during one-half hour while the reaction mixture was stirred and maintained between 25° and 32° C. by external cooling. The mixture was stirred thereafter for 2¼ hours. It was then acidified to bromthymol blue indicator with dilute hydrochloric acid, and stirred with an equal volume of ethylene dichloride. The solution was then washed with water and the ethylene dichloride layer separated and evaporated to dryness under reduced pressure. The residue, consisting of a partially crystalline syrup, weighed 55 grams. It was stirred with a little methanol and the solids filtered off. The yield was 20 grams. Upon recrystallization from methanol the product formed colorless crystals melting at 116–117° C., the analysis of which corresponds to that of a di-cyanoethylation product having the formula $C_{12}H_{16}N_2O$. The original filtrate contained a further quantity of the above crystals, together with a liquid mono-cyanoethylation product of mesityl oxide boiling at 110–115° C./2 mm.

Example 15

To a clear solution of 58 g. of acetone and 9 g. of aqueous 14% trimethylbenzyl ammonium hydroxide solution 159 g. of acrylonitrile was added dropwise while the solution was stirred and cooled to 30–37° C. After the solution had stood for 18 hours at room temperature, the crystalline reaction product was filtered off. Upon recrystallization from glycol monomethyl ether it formed colorless crystals (12 g.) melting at 154° C., the analysis of which agreed with a tri-(cyanoethyl)-acetone. The filtrate, upon neutralization with dilute hydrochloric acid, washing with water, and concentration in vacuo on a steam bath, yielded 109 g. of a syrupy material, comprising higher cyanoalkylation products, which decomposes on distillation under reduced pressure.

Example 16

To a solution of 57 g. of acetonyl acetone in 100 g. of benzene was added 5 g. of aqueous 40% trimethylbenzyl ammonium hydroxide. The solution was stirred and held at 30–35° C. by cooling while 106 g. of acrylonitrile was added dropwise during the course of one hour. The deep red-brown solution was stirred for 20 hours at the ordinary temperature and the crystalline product then filtered off by suction. After the crystals were washed with methanol to remove dark-colored impurities, the product (18 g.) was recrystallized from acetonyl acetone. It separated in colorless crystals, M. P. 180° C., containing 16.45% nitrogen by analysis, apparently a tetra - ($\beta$ - cyanoethyl) - acetonyl acetone. The original filtrate contains a mixture of higher and lower cyanoethylation products. After being washed with water and dried, it forms a dark resin.

Example 17

To a solution of 138 g. of phorone, 138 g. of dioxane, and 9 g. of aqueous 38% trimethylbenzyl ammonium hydroxide solution, there was added dropwise during 50 minutes 53 g. of acrylonitrile while the reaction mixture was stirred and cooled at 31–35° C. The mixture was stirred thereafter for 20 hours at 25° C., then acidified with dilute hydrochloric acid, taken up in ethylene dichloride, washed thoroughly with water, and the ethylene dichloride layer evaporated to dryness in vacuo on a steam bath. The residual oil, weighing 182 g., was distilled in vacuo at 1 mm. After a forerun of 80 g. of unchanged phorone had come over between 65° and 110° C./1 mm., two main fractions were obtained, one of which, weighing 45 g., was a pale yellow oil boiling at 120° C./1 mm., analyzing for a mono-cyanoethylation product of phorone. A second fraction boiling at 190–200° C./1 mm., weighing 14 g., formed a yellow oil analyzing for a di-cyanoethylation product of phorone. The residue, which resisted high vacuum distillation, was a pitch-like mass weighing 38 g.

Example 18

Acrylonitrile (21.2 g.) was added dropwise during 40 minutes to a mixture of 21 g. of dibenzyl ketone, 50 g. of dioxane and 2 g. of aqueous 38% trimethylbenzyl ammonium hydroxide at 30–35° C. while the mixture was stirred. The mixture was allowed to stand 18 hours at 25° C. It was then neutralized with dilute hydrochloric acid and taken up in ethylene dichloride. The solution was washed with water and evaporated to dryness in vacuo on a steam bath. The residue was a viscous, sticky syrup weighing 42 g., consisting essentially of a tetra-cyanoethylation product. It was soluble in methanol.

Example 19

To a solution of 30 g. of p-methoxyacetophenone, 50 g. of dioxane, and 2 g. of 38% trimethylbenzyl ammonium hydroxide there was added dropwise with stirring 31.8 g. of acrylonitrile at a temperature of 35° C. After the mixture was stirred for several hours at 25° C., dilute hydrochloric acid was added until the mixture was acid to litmus. The product was mixed with ethylene dichloride and then washed with water. The ethylene dichloride layer was evaporated to dryness under reduced pressure on a steam bath. The residual oil, weighing 56 g., became crystalline when it was stirred with a little methanol. The product, after recrystallization from methanol, separated in colorless needles melting at 133° C., having the formula

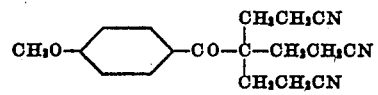

In the same manner the p-ethoxy, p-phenoxy and p-benzyloxy derivatives may be prepared from the corresponding p-substituted acetophenones.

Example 20

Acrylonitrile (31.8 g.) was added dropwise during the course of thirty minutes to a stirred solution consisting of 30.9 g. of p-chloro-acetophenone, 50 g. of dioxane, and 2 g. of aqueous 38% trimethylbenzyl ammonium hydroxide while the reaction mixture was cooled to 32–37° C. The product began to crystallize out at the end of this time. After the mixture had stood 18 hours it was neutralized with dilute hydrochloric acid and the crystals filtered off. The yield was 39 g. Upon recrystallization from methanol, the product formed colorless stout needles melting at 141–142° C., having the formula

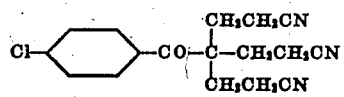

The original filtrate, upon evaporation, yielded 25 g. of viscous oil containing lower cyanoethylated products.

Example 21

To a solution of 19.2 g. of benzoylacetic ethyl ester, 50 g. of dioxane, and 2 g. of aqueous 38% trimethylbenzyl ammonium hydroxide there was added dropwise 10.6 g. of acrylonitrile at 30–32° C. while the mixture was stirred rapidly. The mixture was then heated six hours at 45° C. The product was cooled, neutralized with dilute hydrochloric acid, taken up in ethylene dichloride and washed thoroughly with water. The ethylene dichloride layer was then separated and evaporated to dryness in vacuuo on a steam bath. The residual oil weighed 25 g. Upon distillation at 1 mm., a pale yellow oil came over at 170–175° C., containing 5.60% nitrogen by analysis, corresponding to the monocyanoethylation product having the formula

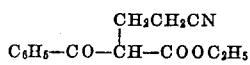

Example 22

To a solution consisting of 57 g. of di-isopropyl ketone, 60 g. of tertiary butanol, and 4 g. of aqueous 38% trimethylbenzyl ammonium hydroxide there was added dropwise 53 g. of acrylonitrile during one hour while the reaction mixture was stirred and the temperature maintained at 33–35° C. The mixture was stirred thereafter for two hours at 25° C., neutralized with dilute hydrochloric acid, taken up in an equal volume of ethylene dichloride and washed with water. The ethylene dichloride layer was evaporated to dryness in vacuo on a steam bath. The residual oil weighed 95 g. Upon distillation at 1 mm. it gave a fraction weighing 62 g. boiling between 80° and 115° C. Upon refractionation in vacuo this cut yielded 33 g. of mono-cyanoethyl-diisopropyl ketone as a colorless oil boiling at 128° C./10 mm., having a $n_{25°d}=1.4428$ and $d_{25°}$ 0.9247, having the formula

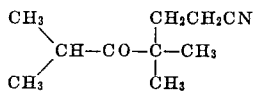

A higher boiling fraction distilling at 165–170° C./1 mm. was also obtained as a colorless oil corresponding to the di-cyano-ethylation product.

Example 23

21.2 g. of acrylonitrile was added dropwise during 15 minutes to a stirred solution of 27 g. of p-bromo-acetophenone, 50 g. of dioxane, and 2 g. of aqueous 38% trimethylbenzyl ammonium hydroxide, while the reaction mixture was maintained between 30° and 40° C. The solution was then stirred for 24 hours at 25° C., acidified with dilute hydrochloric acid, mixed with 50 cc. of ethylene dichloride and the crystals filtered off. The yield was 23 g. After recrystallization from ethanol, the product formed colorless needles melting at 151–152° C. having the formula

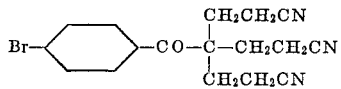

More of the above product can be recovered from the filtrate by evaporation and trituration with ethanol.

Example 24

31.8 g. of acrylonitrile was added dropwise during 25 minutes to a stirred solution consisting of 26.8 g. of p-methyl acetophenone, 50 g. of dioxane, and 2 g. of aqueous 38% trimethylbenzyl ammonium hydroxide at 33–37° C. After standing 48 hours the mixture was neutralized with dilute hydrochloric acid and the crystalline product filtered off. The yield was 25 g. After recrystallization from ethanol, the product formed colorless needles melting at 161–162° C. having the formula

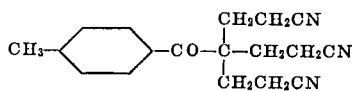

The filtrate contains a further quantity of the product.

Example 25

21.2 g. of acrylonitrile was added at room temperature to a mixture of 29.2 g. of α-tetralone, 50 g. of dioxane, and 4 g. of aqueous 40% trimethylbenzyl ammonium hydroxide solution. The mixture was stirred for 24 hours, then neutralized with dilute hydrochloric acid, washed with water and distilled in vacuo. The fraction boiling at 250–260° C./1 mm. formed a pale yellow oil which gradually solidified to a waxy crystalline mass. After recrystallization from ethanol, the product formed colorless crystals melting at 80° C. having the formula

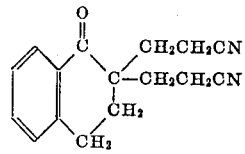

I claim:

1. A process for introducing a $$-CH_2-CH_2-CN$$

group on a carbon atom of a ketone which comprises condensing acrylonitrile in the presence of a quaternary ammonium hydroxide as a condensing agent with a ketone having at least one reactive hydrogen atom attached to a carbon atom contiguous to the ketonic carbonyl group.

2. A process for introducing a $$-CH_2-CH_2-CN$$

group on a carbon atom of a ketone which comprises condensing acrylonitrile in the presence of trimethylbenzyl ammonium hydroxide with a ketone having at least one reactive hydrogen atom attached to a carbon atom contiguous to the ketonic carbonyl group.

HERMAN A. BRUSON.